(12) United States Patent
Simpson

(10) Patent No.: US 9,110,475 B2
(45) Date of Patent: Aug. 18, 2015

(54) INTEGRAL FILTER AND REGULATOR FOR VALVE

(71) Applicant: Hamilton Sundstrand Corporation, Windsor Locks, CT (US)

(72) Inventor: Scott W. Simpson, Easthampton, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 103 days.

(21) Appl. No.: 13/917,312

(22) Filed: Jun. 13, 2013

(65) Prior Publication Data

US 2014/0366965 A1 Dec. 18, 2014

(51) Int. Cl.

| G05D 16/10 | (2006.01) |
|---|---|
| F16K 1/22 | (2006.01) |
| F16K 31/163 | (2006.01) |
| G05D 16/20 | (2006.01) |
| G05D 16/16 | (2006.01) |
| F02C 9/18 | (2006.01) |
| F16K 31/122 | (2006.01) |

(52) U.S. Cl.
CPC .............. G05D 16/2093 (2013.01); F02C 9/18 (2013.01); F16K 31/1225 (2013.01); G05D 16/10 (2013.01); G05D 16/166 (2013.01)

(58) Field of Classification Search
CPC . G05D 16/2093; G05D 16/10; G05D 16/166; F16K 1/221; F16K 31/1635
USPC ........... 137/544, 545, 487.5, 489.5, 495, 492, 137/505.13, 505.15; 251/30.02, 30.05
See application file for complete search history.

(56) References Cited

U.S. PATENT DOCUMENTS

| 2,518,852 A * | 8/1950 | Annin .................... 137/116.5 |
|---|---|---|
| 3,773,296 A * | 11/1973 | McKendrick ............ 254/386 |
| 4,251,985 A | 2/1981 | Sullivan |
| 5,810,031 A * | 9/1998 | Evans et al. ............. 137/557 |
| 2003/0192595 A1* | 10/2003 | Benson .................... 137/488 |
| 2010/0083667 A1 | 4/2010 | Franconi |
| 2012/0199211 A1 | 8/2012 | Schroder et al. |

FOREIGN PATENT DOCUMENTS

WO   WO2013022812 A1   2/2013

OTHER PUBLICATIONS

European Search Report, dated Jan. 30, 2015, for European Patent Application No. 14165227.1, 5 pages.

* cited by examiner

Primary Examiner — Atif Chaudry
(74) Attorney, Agent, or Firm — Kinney & Lange, P.A.

(57) ABSTRACT

A valve assembly comprises a closure element disposed in a flow control duct, a fluid-driven actuator assembly, a shaft operable to translate linear movement of the actuator assembly into rotation of the closure element, and an integral filter and pressure regulator unit disposed in line with an actuator fluid supply passage. The actuator fluid supply passage extends between the flow control duct and the actuator assembly. The integral filter and pressure regulator unit includes a regulator housing having at least one cylindrical wall surrounding a vent cavity and a regulator cavity. Filter media is secured to the regulator housing and is disposed across a regulator orifice in communication with the regulator cavity.

18 Claims, 4 Drawing Sheets

INTEGRAL FILTER AND REGULATOR FOR VALVE

BACKGROUND

The subject matter disclosed herein relates to valves and, more particularly, to pneumatically actuated valves and pressure regulators therefor.

Bleed systems, such as those for aircraft, generally involve taking compressed air from an engine, and converting it to various temperatures and pressures suitable for one or more uses. Pressure is usually managed through one or more bleed control valves, such as butterfly valves. Depending on the aircraft configuration, bleed control valves can be generally controlled either pneumatically, electronically, or both via through proportional and/or integral feedback control loops.

Pneumatic control is done through physical components, flow passages, levers, etc., while electronic control utilizes electrical signals. An electronically controlled proportional valve generally is operated by receiving an electrical control signal which corresponds to a valve position. An electronically controlled integrating valve is controlled with an electrical signal that corresponds to a valve velocity, causing the valve to open or close due to the valve travelling at a velocity for a certain amount of time.

Maintaining stable bleed system pressures can improve performance and decrease valve wear. Bleed system pressures can be stabilized, for example, by resisting cycling and input disturbances in the system. At the same time, actuator components are prone to particulate damage from fluids being drawn in from the flow duct. Constant actuator fluid supply pressure improves proportional control of pneumatically actuated valves and prevents fluttering of the closure element or disk. Existing systems for regulating valve actuation pressure can require separate regulator units and filter units which take up needed space on the valve assembly and add weight.

SUMMARY

A valve assembly comprises a closure element disposed in a flow control duct, a fluid-driven actuator assembly, a shaft operable to translate linear movement of the actuator assembly into rotation of the closure element, and an integral filter and pressure regulator unit disposed in line with an actuator fluid supply passage. The actuator fluid supply passage extends between the flow control duct and the actuator assembly. The integral filter and pressure regulator unit includes a regulator housing having at least one cylindrical wall surrounding a vent cavity and a regulator cavity. Filter media is secured to the regulator housing and is disposed across a regulator orifice in communication with the regulator cavity.

A pressure regulator unit comprises a regulator housing having a first cylindrical wall portion defining a regulator cavity, and a second cylindrical wall portion defining a vent cavity in selective communication with the regulator cavity. A regulator inlet orifice and a regulator outlet orifice are formed through the regulator housing proximate the first cylindrical wall portion. First filter media is secured to a regulator side of the regulator housing and disposed across a first regulator orifice.

A bleed air control valve comprises a closure disk rotatable within a flow control duct, a pneumatic actuator operable to drive rotation of the closure disk, a connecting rod, a shaft, and an actuator fluid supply passage. The pneumatic actuator includes a first piston disposed between a first pressure chamber and a second pressure chamber, a second piston disposed between the second pressure chamber and a third pressure chamber, and an integral filter and pressure regulator unit disposed in line with the actuator fluid supply passage. The shaft includes a first end connected to a connecting rod linking the first and second pistons, and a second end connected to the closure disk. The actuator fluid supply passage provides communication between an inlet side of the flow control duct and at least one of the first, second, and third pressure chambers. The integral filter and pressure regulator unit has a cylindrical regulator cavity in selective communication with a cylindrical vent cavity. Filter media is secured to the pressure regulator unit and is disposed across at least one of a regulator inlet orifice and a regulator outlet orifice.

DETAILED DESCRIPTION

Figure 1:
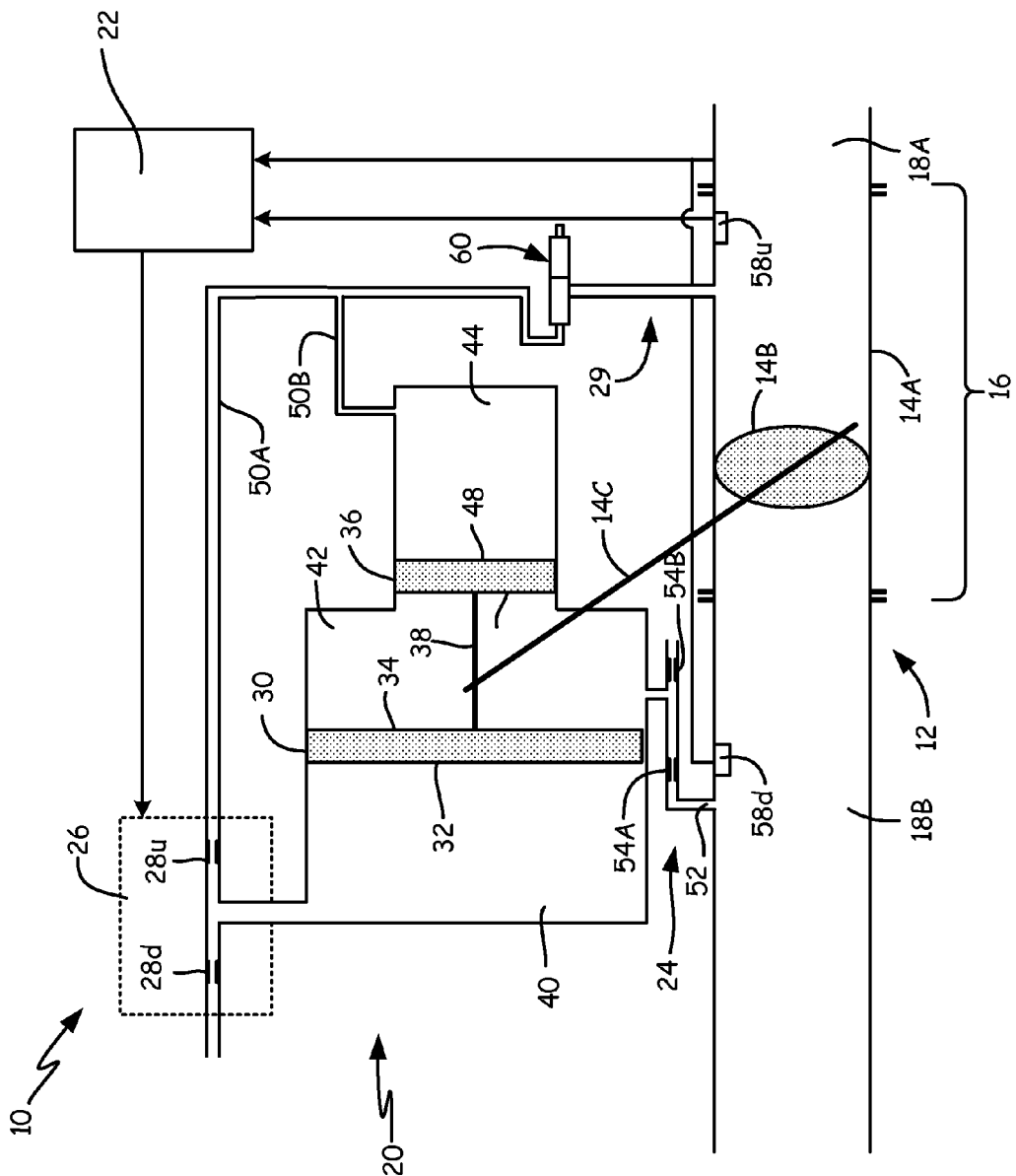
FIG. 1 is a block diagram of a valve according to a first embodiment.

FIG. 1 is a block diagram of a valve according to a first embodiment. FIG. 1 shows airflow control system 10, butterfly valve 12, valve housing 14A, disk 14B, shaft 14C, flow control passage 16, upstream flow passage 18A, downstream flow passage 18B, valve actuator 20, electronic controller 22, pneumatic feedback system 24, torque motor 26, electronic flow restrictions $28_u$, $28_d$, actuator fluid supply passage 29, first piston 30 (with first side 32 and second side 34), second piston 36, connection rod 38, first pressure chamber 40, second pressure chamber 42, third pressure chamber 44, second piston first side 46, second piston second side 48, actuator fluid supply passage portions 50A, 50B, feedback flow passage 52, pneumatic flow restrictions 54A, 54B, upstream electronic pressure sensor $58_u$, and downstream electronic pressure sensor $58_d$.

In the example shown, valve assembly 12 is a butterfly-type valve, and airflow control system 10 forms part of an aircraft bleed air system. However, it will be appreciated that airflow control system 10 and valve assembly 12 are not necessarily limited to aircraft bleed systems, and thus can be adapted to find use in numerous other airflow control applications.

Airflow control system 10 includes butterfly valve 12 with valve housing 14A, closure disk 14B, and shaft 14C. Closure disk 14B is a closure element rotatable in valve flow control passage 16 to manage flow between upstream flow passage 18A and downstream flow passage 18B. Valve actuator 20, which can be driven by a fluid such as air, works to rotate valve disk 14B in a range between fully closed and fully open to regulate pressure in downstream flow passage 18B. Operation of valve actuator 20, which drives rotation of closure disk 14B, can be managed, for example using electronic controller 22 and/or optional pneumatic feedback system 24. Torque motor 26 is operable to adjust relative sizes of flow restriction $28_u$ and/or $28_d$ in accordance with a command to close or open valve 12. In other embodiments, another control device, such as a solenoid, pneumatic control, or similar structure is used in place of torque motor 26 to adjust valve 12.

In the example shown, actuator 20 can include first piston 30 disposed between first pressure chamber 40 and second pressure chamber 42. Optional second piston 36, which can be disposed between second pressure chamber 42 and third pressure chamber 44, offers more control and valve stability as described below. As seen in FIG. 1, first piston 30 and optional second piston 36 move together (via connection rod 38) due to respective pressures in first pressure chamber 40, second pressure chamber 42 and third pressure chamber 44. Pressure in first pressure chamber 40 acts on first side 32 of first piston 30 and acts as an opening force for valve 12. Pressure in second pressure chamber 42 acts on second side 34 of first piston 30 more so than first side 46 of second piston 36 due to the larger surface area of first piston 30, thereby acting as a first closing force on valve disk 14B. Pressure in third pressure chamber 44 acts on second side 48 of second piston 36 to act as a second closing force on valve disk 14B. In alternate embodiments, the actuator pistons may also be aligned such that pressure changes in chamber 40 closes the valve.

Pressure in first pressure chamber 40 and third pressure chamber 44 is delivered via different branches of actuator fluid supply passage 29. Actuator fluid supply passage 29 draws a small amount of fluid from upstream flow passage 18A or an upstream/inlet side of flow control duct 16. Actuator supply passage 29 branches into first supply portion 50A leading to first pressure chamber 40 and second supply portion 50B leading to third pressure chamber 44. Relative actuation pressures are controlled by torque motor 26 to drive rotation of closure disk 14B. If torque motor 26 is acting to open valve 12, it will increase flow area at restriction $28_u$ and/or decrease flow area at restriction $28_d$, which increases pressure (and force) applied to first side 32 of first piston 30. To close valve 12, torque motor 26 will decrease flow area $28_u$ or increase flow area $28_d$ (which flows overboard or to an area of ambient pressure). Pressure in first pressure chamber 40, is decreased relative to second pressure chamber 42 and third pressure chamber 44 to create a closing force against first piston 30 and second piston 36. Shaft 14C is operable to translate movement of first piston 30 and second piston 44 to rotate valve disk 14B via lever arm or other suitable mechanism for translating linear movement into rotational movement.

Valve 12 can include optional pneumatic feedback system 24 to provide pneumatic feedback to valve actuator 20 and stabilize valve disk 14B. Flow restrictions 54A, 54B are set in flow passage 52 to ensure that pressure flowing into second pressure chamber 42 is coupled to, but also some amount less than, pressure in downstream flow passage 18B. This allows full opening of valve 12 as needed, while also helping to slow movement of pistons 30, 36, and in turn movement of valve disk 14B. It also acts as a pneumatic feedback for valve actuator 20 so that controller 22 can send an appropriate signal to torque motor 26 and modulate applicable flow areas $28_u$ and $28_d$. An excess pressure increase in downstream flow passage 18B causes pressure to be fed back into second pressure chamber 42 and act as a closing force.

Accuracy and precision of proportional controlled valves can be improved by providing a substantially constant actuator fluid supply pressure from the upstream through the passages. For example, if actuator fluid supply pressure exceeds levels expected by the control system and/or torque motor 26, the pressure differential between pressure chambers 40, 42, and/or 44 will depart from the commanded value, causing error in the actuator position, and increasing the likelihood of valve cycling. It is also important to ensure particles from the flow passage do not reach the pressure chambers when the actuation fluid is drawn in through the supply passage. Thus valve 12 can include integral regulator and filter assembly 60 disposed in line with actuator supply passage 29. An example construction for a valve and a line replaceable unit for the valve is also described and shown in subsequent figures.

Figure 2:
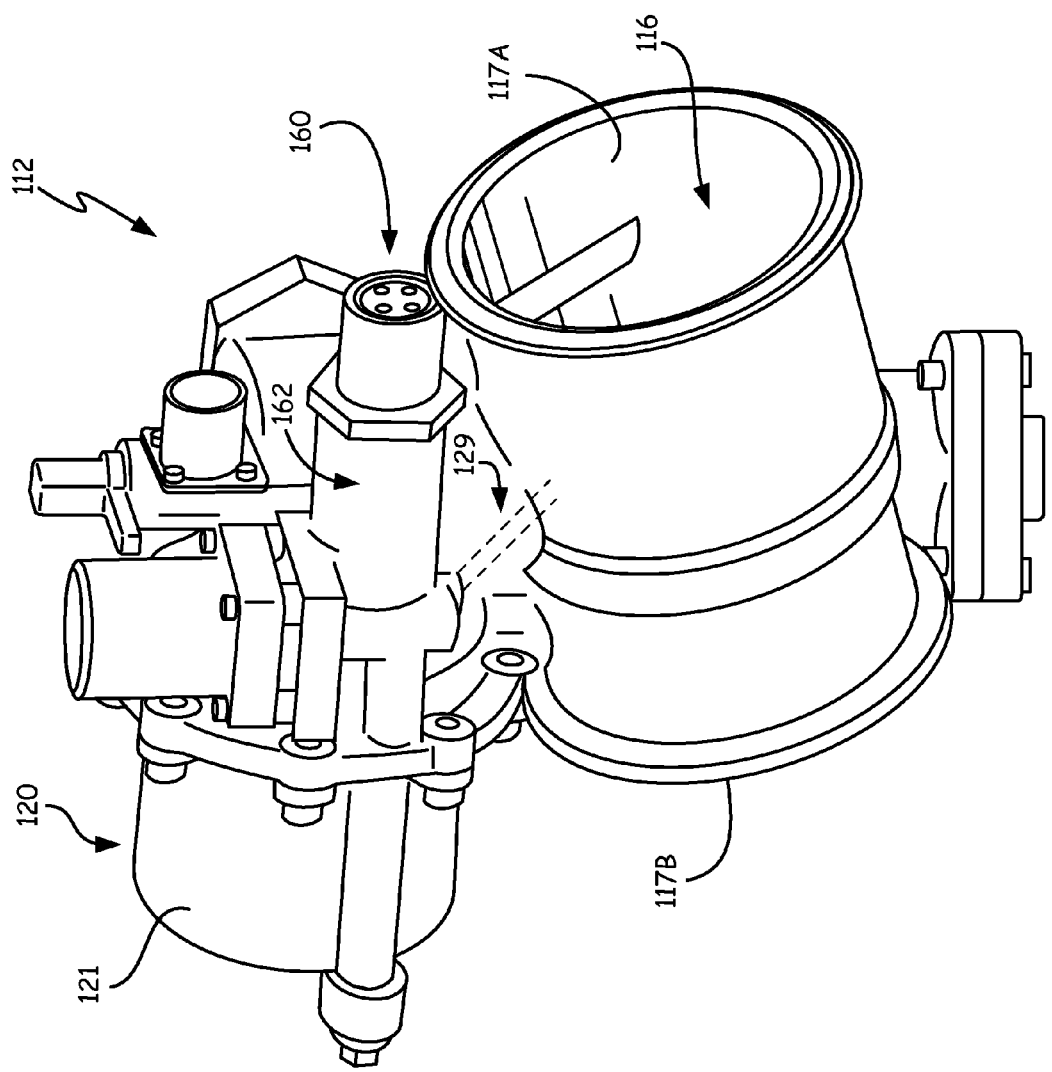
FIG. 2 shows an example butterfly-type valve including an actuator and a pressure regulator having an integral filter.

FIG. 2 depicts an example construction of a fluid-actuated valve assembly 112. Valve assembly 112 generally includes housing 114A, bore 114B, flow control duct 116, inlet 117A, outlet 117B, actuator section 120, actuator housing 121, actuator supply passage 129, integral filter and pressure regulator unit 160, and regulator receptacle 162. Similar reference numbers indicate similar elements and/or function unless otherwise described.

FIG. 2 shows valve assembly 112, which includes a closure element (e.g., disk 14B shown in FIG. 1), disposed in flow control duct 116 between valve inlet 117A and valve outlet 117B. Fluid-driven actuator assembly 120 is operable to drive the closure element to regulate fluid passing through flow control duct 116. Actuator assembly 120 can use a pressurized fluid (e.g., compressor bleed air) redirected from an upstream of inlet side of flow control duct 116. The fluid may be communicated from flow control duct 116 to actuator assembly 120 through any suitable means. Valve assembly 112 also includes integral filter and pressure regulator unit 160. Unit 160 can be a line replaceable unit (LRU) which can be readily inserted and removed from actuator assembly 120 as a single element. In the example shown, unit 160 can be threaded into regulator receptacle 162.

In one example, one or more actuator supply passages 129 (best seen in FIG. 3) to provide communication between flow control duct 116 and one or more pressure chambers in actuator assembly 120. Actuator supply passage 129 can include one or more branch lines (shown in FIG. 3) to provide fluid from flow control duct 116 to various pressure chambers of actuator 120 contained in actuator housing 121. These pressure chambers receiving actuation fluid from supply passage(s) 129 can include, for example, one or more of chambers 40, 42, 44, as well as flow restriction(s) $28_u$, $28_d$, shown in FIG. 1.

Regulator unit 160 has a geometry which allows for incorporation of integral filter media in line with actuator fluid supply passage 129. As shown in more detail in FIGS. 3 and 4, the regulator filter media can be disposed across one or both of an inlet or outlet regulator orifice in communication with the regulator cavity. This arrangement makes valve 112 lighter, more compact, and allows for simple on-wing cleaning and/or replacement. Filter media can be brazed onto the line replaceable regulator unit, allowing for periodic cleaning during inspection or repair of the regulator.

Many existing butterfly valves for aircraft bleed systems include a changeable filter cartridge separate from the pressure regulator unit. Since the separate filter cartridge requires more frequent cleaning and/or replacement as compared to a pressure regulator, the filter cartridge has been previously placed in a more accessible location. However, the regulator is typically located in a less accessible location as compared to the filter cartridge. Space constraints have prevented the ability to make both the filter cartridge and the regulator accessible for on-wing maintenance. Thus the regulator cannot be inspected, repaired, or replaced without substantial disassembly of the valve, or the overall airflow control (e.g., bleed) system. This increases maintenance cost and risk for such systems.

In contrast, filtered pressure regulator unit 160 is arranged to be easily accessible and removable from valve 112. Both the filter media and the regulator can be inspected, cleaned, and/or replaced as part of regular on-wing maintenance tasks, increasing reliability of the bleed system and reducing wear due to excess valve cycling from a damaged regulator. The configuration also reduces weight and packaging requirements of valve 112.

Figure 3:
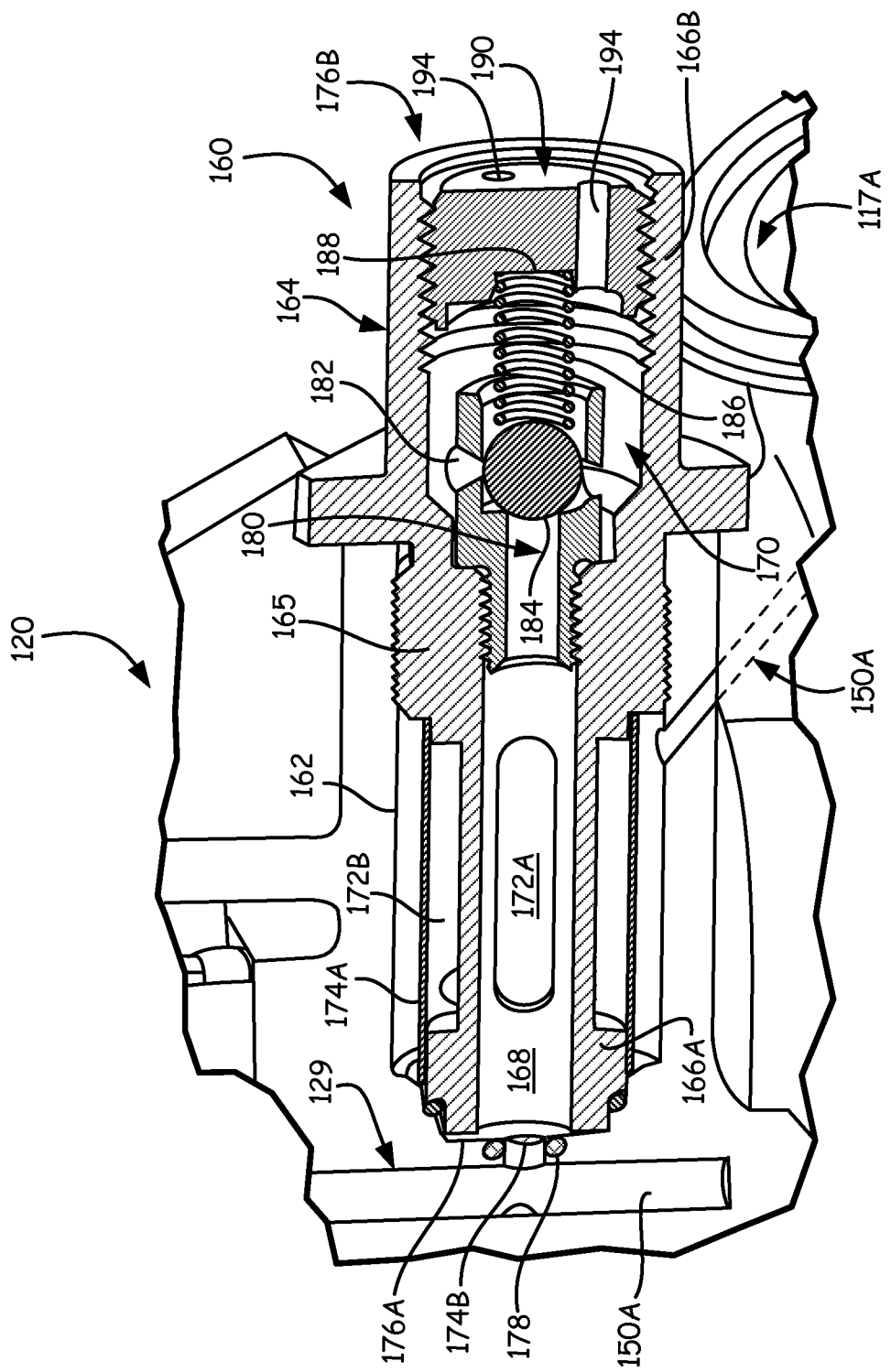
FIG. 3 is a sectional view taken through the actuator and the pressure regulator of FIG. 1.

FIG. 3 shows a sectional view through actuator assembly 120 and filtered pressure regulator unit 160 adjacent valve inlet 117A. Regulator housing 164, secured in receptacle 162, includes at least one cylindrical wall 166A, 166B respectively surrounding regulator cavity 168 and vent cavity 170. Regulator housing 164 can also include threaded portion 165 for retaining filtered pressure regulator unit 160 in actuator assembly 112. Regulator cavity 168 has at least one inlet orifice 172A and outlet orifice 172B formed through regulator housing 164, and each orifice 172A, 172B is disposed in line with actuator supply passage 129. Actuator supply passage 129 can include upstream portion 176A extending between flow control duct 116 (e.g., valve inlet 117A shown in FIG. 2), and regulator receptacle 162. This provides communication between flow control duct 116 and inlet orifice(s) 172A. Downstream portion 176B of actuator supply passage 129 can extend between regulator receptacle 162 and actuator pressure chambers (shown in FIG. 1) contained in actuator housing 121 (shown in FIG. 3), which provides communication between outlet orifice(s) 172B and the actuator pressure chamber(s). The arrangement disclosed herein keeps contaminates on the outside of the filter. Air from the bleed duct enters the chamber outside of the filter and in then regulated, e.g. by dumping some of the airflow to ambient, and the remaining airflow is ported out through orifice 172B.

Taking the place of a separate filter cartridge, FIG. 2 shows filter media 174A, 174B can be secured to regulator housing 164, so that it is disposed across at least one of inlet orifice 172A, and outlet orifice 172B. Filter media 174A, 174B, which can be a permanent metal mesh capable of withstanding the fluid temperatures and pressures in actuator fluid supply passage 129, is disposed so that it traverses actuator fluid supply passage 129 upstream of the actuator pressure chambers along upstream actuator fluid supply branch 150A. In alternate embodiments, the flow through the filtered pressure regulator unit 160 may be reversed, e.g., those items described as upstream may be downstream, and vice versa. In this example, first filter media 174A is secured peripherally around a first cylindrical portion 176 of regulator housing 164, around regulator cavity 168. Here, regulator cavity 168 has multiple inlet orifices 172A around the first cylindrical portion of regulator housing 164. Additionally and/or alternatively, second filter media 174B is secured to at least one regulator outlet orifice 172B disposed through first axial wall 176A. Seal 178 can be placed around regulator housing outlet orifice 172B adjacent first axial wall 176A in order to segregate the inlet and outlet flows through regulator cavity 168.

Figure 4:
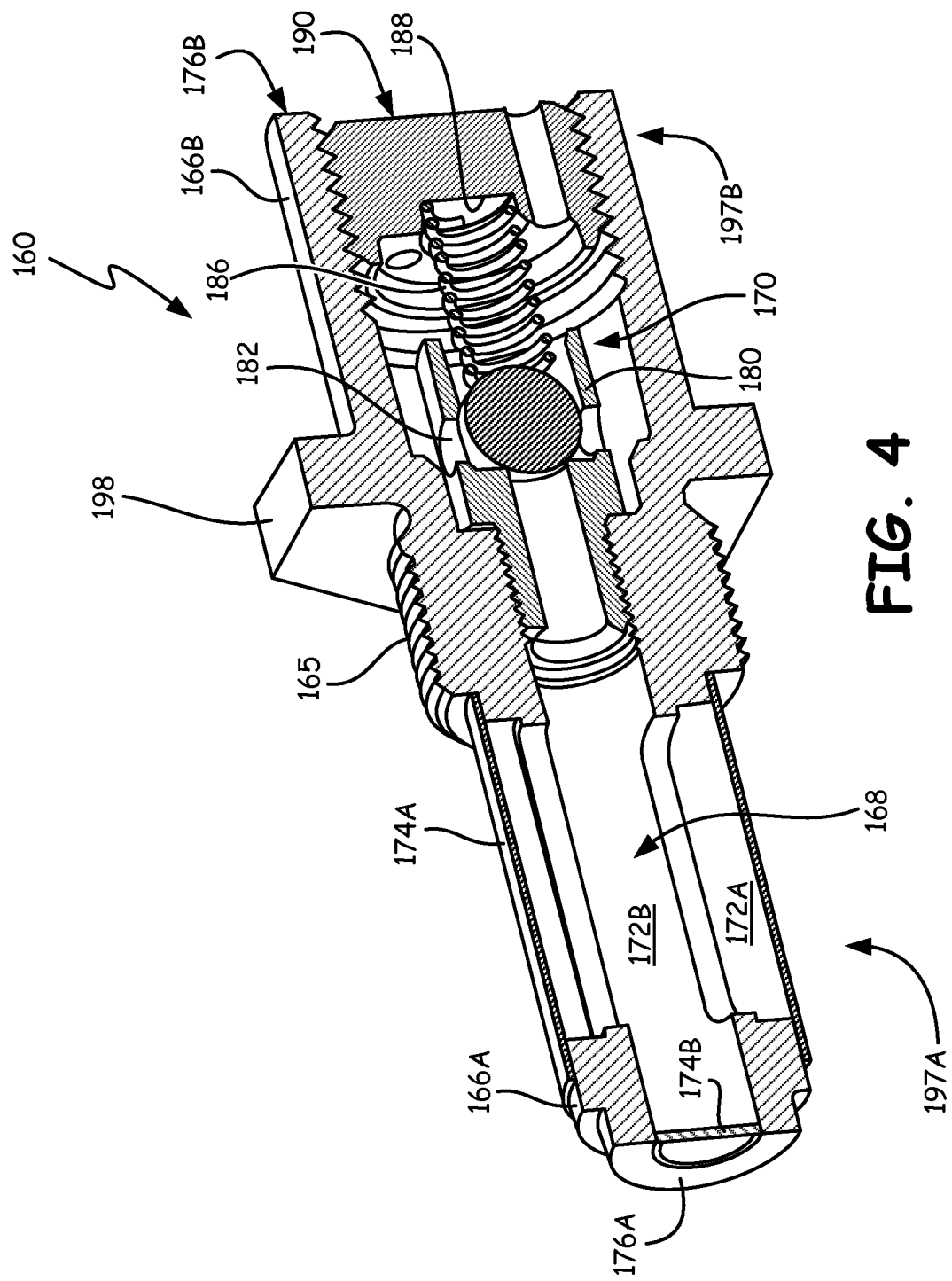
FIG. 4 shows an example embodiment of a line replaceable regulator unit with an integral filter.

In the illustrative example of FIGS. 3 and 4, regulator nozzle 180 is disposed between vent cavity 170 and regulator cavity 168. Regulator nozzle 180 provides at least one regulator port 182 in selective communication with regulator cavity 168 in order to vent excess actuator fluid supply pressure contained in actuator fluid supply passage 129. In the example shown, filtered pressure regulator unit 160 includes ball 184 disposed in regulator nozzle 180 against resilient element 186. Resilient element 186 reacts against seat surface 188, providing a closure force to bias ball 184 against regulator port(s) 182. In certain embodiments, seat 188 can be in inwardly facing surface of adjustment screw 190 movable within vent cavity 170. Adjustment screw 190 can be accessed from the outside of valve 112 to periodically vary a magnitude of the expected maximum closure force. Seat 188 and/or adjustment screw 190 can include at least one vent orifice 194 for ventilating excess fluid from the vent cavity. In this configuration, vent orifice 194 ejects excess air pressure overboard into the ambient atmosphere.

FIG. 4 shows line replaceable filtered pressure regulator unit 160. As was seen in FIG. 3, regulator housing 160 can include cylindrical regulator wall 166A defining regulator cavity 168, and cylindrical vent wall 166B defining vent cavity 170, which is in selective communication with regulator cavity 168 via regulator nozzle 180. In this example, elongated inlet orifices 172A are covered by inlet filter media 174A, while outlet orifice 172B is formed through first axial wall 176A, and is additionally and/or alternatively covered by outlet filter media 174B. Adjustment screw 190 (with seat 188) is disposed through second axial wall 176B.

Each cylindrical wall 166A, 166B has a corresponding nominal diameter 196A, 196B which may be different from one another. For example, a smaller diameter regulator side can reduce the cross-sectional area and/or volume occupied by regulator side 197A within valve 112 (shown in FIGS. 2 and 3). An outer surface of cylindrical wall 166A can include threaded portion 165 adjacent external flange 198 to simplify insertion and removal of filtered pressure regulator unit 160 into a corresponding recess (e.g., receptacle 162 shown in FIG. 3).

Operation of other types of fluid driven valve actuators is well known, and will not be described in detail here. For example, other fluid driven valve actuators may have a single cylinder opposing a spring or other constant counterforce taking the place of the second and/or third pressure chambers shown in FIG. 1. However, it will be appreciated that an integrated filter and regulator unit can be incorporated into actuator fluid supply passages to provide constant feed pressure to accurately provide actuator piston pressure(s).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A valve assembly comprising:
a closure element disposed in a flow control duct;
a fluid-driven actuator assembly including a first piston disposed between a first pressure chamber and a second pressure chamber, and a shaft linked to the first piston, the shaft operable to translate linear movement of the first piston into rotation of the closure element;
an actuator fluid supply passage extending between the flow control duct and the first pressure chamber; and
an integral filter and pressure regulator unit disposed in line with the actuator fluid supply passage, the integral filter and pressure regulator unit including a regulator housing having at least one cylindrical wall surrounding a vent cavity and a regulator cavity, and filter media secured to the regulator housing and disposed across a regulator orifice in communication with the regulator cavity;
wherein the regulator orifice is formed through an axial wall of the regulator housing adjacent the regulator cavity.
2. The valve assembly of claim 1, wherein the closure element comprises a disk.
3. The valve assembly of claim 1, wherein the fluid-driven actuator assembly also includes a second piston disposed between the second pressure chamber and a third pressure chamber, the first and second pistons linked by a connecting rod, and the connecting rod linked to the shaft.

4. The valve assembly of claim 1, wherein the regulator orifice includes at least one opening formed through a portion of the at least one cylindrical wall defining the regulator cavity.

5. An integral filter and pressure regulator unit comprising:
a regulator housing having a first cylindrical wall portion defining a regulator cavity, and a second cylindrical wall portion defining a vent cavity in selective communication with the regulator cavity;
a regulator inlet orifice and a regulator outlet orifice formed through the regulator housing proximate the first cylindrical wall portion;
a regulator nozzle disposed axially between the vent cavity and the regulator cavity, the regulator nozzle having at least one regulator port providing selective communication between the vent cavity and the regulator cavity; and
first filter media secured to a regulator side of the regulator housing and disposed across one of: the regulator inlet orifice and the regulator outlet orifice.

6. The pressure regulator unit of claim 5, wherein the first cylindrical portion has a first nominal diameter and the second cylindrical portion has a second nominal diameter larger than the first nominal diameter.

7. The pressure regulator unit of claim 5, wherein the vent cavity is longitudinally adjacent to the regulator cavity.

8. The pressure regulator unit of claim 5, further comprising:
a ball disposed in the regulator nozzle; and
a resilient element disposed in the vent cavity, the resilient element including a first end abutting a seat surface, and a second end receiving applying a closure force to bias the ball toward the at least one regulator port.

9. The pressure regulator unit of claim 8, wherein the closure force corresponds to a maximum regulator pressure in the regulator cavity.

10. The pressure regulator unit of claim 9, further comprising:
an adjustment screw movable longitudinally within the vent cavity to vary a location of the seat surface,
wherein the location of the seat surface defines a length of the resilient element and a resulting magnitude of the closure force.

11. The pressure regulator unit of claim 10, wherein at least one vent orifice is formed through the adjustment screw for directing fluid overboard from the vent cavity.

12. The pressure regulator unit of claim 5, further comprising:
second filter media secured to the regulator housing and disposed across a second regulator orifice.

13. A bleed air control valve comprising:
a closure disk rotatable within a flow control duct;
a pneumatic actuator operable to drive rotation of the closure disk, the pneumatic actuator including a first piston disposed between a first pressure chamber and a second pressure chamber, and a second piston disposed between the second pressure chamber and a third pressure chamber
a connecting rod linking the first piston to the second piston;
a shaft including a first end connected to the connecting rod and a second end connected to the closure disk, the shaft operable to translate linear movement of the first and second piston into rotation of the closure disk;
an actuator fluid supply passage providing communication between an inlet side of the flow control duct and at least one of the first pressure chamber, the second pressure chamber, and the third pressure chamber;
an integral filter and pressure regulator unit disposed in line with the actuator fluid supply passage, the unit having a cylindrical regulator cavity in selective communication with a cylindrical vent cavity, with filter media secured to the pressure regulator unit and disposed across at least one of a regulator inlet orifice and a regulator outlet orifice; and
a regulator nozzle disposed axially between the vent cavity and the regulator cavity, the regulator nozzle having at least one regulator port providing selective communication between the vent cavity and the regulator cavity.

14. A valve assembly comprising:
a closure element disposed in a flow control duct;
a fluid-driven actuator assembly including a first piston disposed between a first pressure chamber and a second pressure chamber, and a shaft linked to the first piston, the shaft operable to translate linear movement of the first piston into rotation of the closure element;
an actuator fluid supply passage extending between the flow control duct and the first pressure chamber; and
an integral filter and pressure regulator unit disposed in line with the actuator fluid supply passage, the integral filter and pressure regulator unit including a regulator housing having at least one cylindrical wall surrounding a vent cavity and a regulator cavity, and filter media secured to the regulator housing and disposed across a regulator orifice in communication with the regulator cavity;
wherein the pressure regulator unit also includes a regulator nozzle disposed in the vent cavity, the regulator nozzle having at least one regulator port in selective communication with the regulator cavity.

15. The valve assembly of claim 14, wherein the pressure regulator unit also includes a ball disposed in the regulator nozzle and a resilient element providing a closure force to bias the ball against the at least one regulator port.

16. The valve assembly of claim 15, wherein the resilient element reacts against a seat surface distal from the regulator cavity.

17. The valve assembly of claim 16, wherein the pressure regulator unit also includes an adjustment screw movable longitudinally within the vent cavity to vary a location of the seat surface, the location of the seat surface defining a length of the resilient element and a resulting magnitude of the closure force.

18. The valve assembly of claim 17, wherein the adjustment screw includes at least one vent orifice for ventilating excess fluid overboard from the vent cavity.

* * * * *